(12) United States Patent
Portas et al.

(10) Patent No.: US 9,590,410 B2
(45) Date of Patent: Mar. 7, 2017

(54) SCREEN CONNECTORS FOR ELECTRICAL CABLES AND JOINTING ASSEMBLIES COMPRISING THE SCREEN CONNECTOR

(75) Inventors: Francesco Portas, Milan (IT); Tania Collina, Milan (IT); Javier Gracia Alonso, Milan (IT)

(73) Assignee: PRYSMIAN S.p.A., Milan (IT)

( * ) Notice: Subject to any disclaimer, the term of this patent is extended or adjusted under 35 U.S.C. 154(b) by 313 days.

(21) Appl. No.: 13/992,957

(22) PCT Filed: Dec. 22, 2010

(86) PCT No.: PCT/EP2010/007853
§ 371 (c)(1),
(2), (4) Date: Sep. 9, 2013

(87) PCT Pub. No.: WO2012/083986
PCT Pub. Date: Jun. 28, 2012

(65) Prior Publication Data
US 2014/0000928 A1    Jan. 2, 2014

(51) Int. Cl.
*H01R 4/00* (2006.01)
*H02G 15/18* (2006.01)
(Continued)

(52) U.S. Cl.
CPC ............ *H02G 15/18* (2013.01); *H02G 15/188* (2013.01); *H02G 15/1826* (2013.01); *H02G 15/068* (2013.01); *H02G 15/1833* (2013.01)

(58) Field of Classification Search
CPC ........ H01R 4/70; H01R 4/723; H01R 9/0512; H01R 13/512; H01R 13/59; H01R 9/0506;
(Continued)

(56) References Cited

U.S. PATENT DOCUMENTS 3,163,707 A * 12/1964 Darling .................... A47L 9/24
128/204.18
3,728,472 A * 4/1973 Leuteritz et al. ............... 174/78
(Continued)

FOREIGN PATENT DOCUMENTS

EP    1 843 442 A2    10/2007
EP    1 852 949 A1    11/2007
(Continued)

OTHER PUBLICATIONS

Chéenne-Astorino, A. et al., Cold Shrinkable Technology for Medium Voltage Cable Accessory; pp. 386-390, Euromold-Alcatel, Belgium, Sep. 9, 1996.
(Continued)

*Primary Examiner* — Angel R Estrada
*Assistant Examiner* — Pete Lee
(74) *Attorney, Agent, or Firm* — MH2 Technology Law Group LLP (57) ABSTRACT

A screen connector for electrical cables may include: a conductive shield sock extending about a longitudinal axis and configured to couple to a conductive screen of at least one electrical cable or to at least one jointing assembly for the electrical cables; a shrinkable protective sleeve arranged in a radially outer position with respect to the conductive shield sock; at least one first removable support element arranged in a radially inner position with respect to the conductive shield sock and configured to hold the conductive shield sock and the shrinkable protective sleeve in a radially expanded state; and/or at the axially opposite end portions of the screen connector, at least one watertight element. The at least one watertight element may be radially interposed between the conductive shield sock and the shrinkable protective sleeve.

17 Claims, 6 Drawing Sheets

(51) Int. Cl.
*H02G 15/188* (2006.01)
*H02G 15/068* (2006.01)

(58) Field of Classification Search
CPC ........ H01R 4/20; H02G 15/003; H02G 15/04; H02G 15/18; H02G 15/115; H02G 3/0431; H02G 3/26; H02G 15/188; H02G 15/068; H02G 15/1833; H02G 15/1826
USPC ...................................................... 174/84 R
See application file for complete search history.

(56) References Cited

U.S. PATENT DOCUMENTS

| | | | | |
|---|---|---|---|---|
| 4,435,639 | A | * | 3/1984 | Gurevich ........................ 219/544 |
| 4,667,064 | A | * | 5/1987 | Sheu ............................ 174/84 R |
| 4,740,653 | A | * | 4/1988 | Hellbusch .............. H02G 15/24 |
| | | | | 174/21 R |
| 5,315,063 | A | * | 5/1994 | Auclair ................ G02B 6/4415 |
| | | | | 174/108 |
| 6,103,975 | A | * | 8/2000 | Krabs .................. H02G 15/103 |
| | | | | 174/74 A |
| 2007/0256852 | A1 | | 11/2007 | Cardinaels et al. |
| 2010/0276196 | A1 | | 11/2010 | Seraj et al. |

FOREIGN PATENT DOCUMENTS

| | | |
|---|---|---|
| RU | 2093937 C1 | 10/1997 |
| SU | 720594 A1 | 3/1980 |
| WO | WO-98/40941 A1 | 9/1998 |
| WO | WO-00/01048 A1 | 1/2000 |
| WO | WO-2010/091017 A1 | 8/2010 |

OTHER PUBLICATIONS

International Search Report PCT/ISA/210 for PCT/EP2010/007853 dated Sep. 30, 2011.
Examinees Initials Mar. 11, 2015, Russian Decision on Granting issued in corresponding Russian Application No. 2013133699/07 (050401) with English-language translation.

* cited by examiner

SCREEN CONNECTORS FOR ELECTRICAL CABLES AND JOINTING ASSEMBLIES COMPRISING THE SCREEN CONNECTOR

CROSS-REFERENCE TO RELATED APPLICATION(S)

This application is a national stage entry from International Application No. PCT/EP2010/007853, filed on Dec. 22, 2010, in the Receiving Office of the European Patent Office, the entire contents of which are incorporated herein by reference.

The present invention relates to a screen connector for electrical cables or for a jointing assembly for electrical cables, in particular high voltage electrical cables.

The invention further relates to a jointing assembly for electrical cables comprising said screen connector.

Throughout the present description and the attached claims, the term "jointing assembly" is used to indicate either a joint, that is a jointing assembly specifically provided for mechanically and electrically connecting two electrical cables, or a termination, that is a jointing assembly specifically provided for mechanically and electrically connecting an electrical cable to a different device, such as for example an electrical power source, a transformer, a user device etc.

In the present description, the term "medium voltage" is used to refer to a tension typically from about 1 kV to about 30 kV, while the term "high voltage" refers to a tension above 30 kV. The term "very high voltage" is used to define a voltage greater than about 150 kV or 220 kV, up to 500 kV or more.

High voltage electrical cables typically comprise one or more conductors covered by an insulating layer. A conductive screen is coaxially applied at a radially outer position with respect to the insulating layer. A protective sheath is coaxially applied at a radially outer position with respect to the conductive screen.

In operation, e.g. in an electrical joint, it can be required to electrically connect the conductive screen of the electrical cable to the ground or to a jointing assembly.

WO 2010/091017 discloses a jointing device wherein a metallic shield sock surrounds a splice body hold in a radially expanded state by a support core. The shield sock cab be put in electrical contact with a metallic shield of a cable by the use of one or more mechanic clamps, which may be a constant force spring. A ground braid extending through the jointing device adjacent to the shield sock is adapted to be connected to a ground wire or cable. Through the metallic shield sock the metallic shield of the cable can be in electrical contact with a metallic shield of another electrical cable. Afterwards, the support core is removed from the jointing device thus causing shrinking of the splice body over the cable. Finally, a previously folded end portion of an outer jacket of the jointing device is unfolded to fully cover the mechanic clamps and the adjacent portions of the jointing device and the cable.

The Applicant observed that using mechanic clamps of the aforementioned type causes an increase of the time and complexity of the splicing operation because of the time required to properly mount the clamps in the desired axial position to achieve the desired electrical contact between the shield sock of the jointing device and the metallic shield of the cable. The time and complexity of the splicing operation is further increased by the necessity to weld the ground braid to the shield sock of the jointing device. In addition thereof, a perfect and reliable electrical contact cannot be achieved because of possible axial displacements of the clamps which could occur in particular when the outer jacket of the splice assembly is unfolded to fully cover the mechanic clamps and the adjacent portions of the jointing device and the cable.

The Applicant faced the technical problem of reducing the time and complexity of the splicing operation while ensuring a perfect and steady electrical contact between the shield sock of a jointing assembly and the metallic shield of the cable.

As disclosed in more detail below, the Applicant found that this problem can be solved by providing a specific radially shrinkable sleeve adapted to tighten the shield sock of the jointing assembly onto the metallic shield of the cable.

In particular, the Applicant found that an effective and steady electrical contact between the shield sock of the jointing assembly and the metallic shield of the cable can be provided by using a screen connector including a conductive shield sock covered by a shrinkable protective sleeve held in a radially expanded state by a removable support element, wherein removal of the support element causes the shrinkable protective sleeve and the conductive shield sock to shrink onto the shield sock of the jointing assembly and the metallic shield of the cable, thus tightening the conductive shield sock of the screen connector onto the shield sock of the jointing assembly and the metallic shield of the cable.

The Applicant also found that the aforementioned screen connector can be advantageously used not only for connecting the metallic shield of one electrical cable to the metallic shield of another electrical cable through the shield sock of the jointing assembly, but also for connecting the metallic shield of one electrical cable to the ground or to a termination or to the metallic shield of another electrical cable connected to another jointing assembly.

Accordingly, in a first aspect thereof, the present invention relates to a screen connector for electrical cables, comprising:
  a conductive shield sock extending about a longitudinal axis and adapted to be coupled to a conductive screen of at least one electrical cable or to at least one jointing assembly for electrical cables;
  a shrinkable protective sleeve arranged in a radially outer position with respect to said conductive shield sock;
  at least one removable support element arranged in a radially inner position with respect to said conductive shield sock and adapted to hold said conductive shield sock and said shrinkable protective sleeve in a radially expanded state.

In a second aspect thereof, the present invention relates to a jointing assembly for electrical cables, comprising a shrinkable sleeve made from a dielectric material and extending about a longitudinal axis and, at at least one axial end portion of said shrinkable sleeve, a screen connector of the above-described type.

In accordance with the present invention, said jointing assembly can be in a radially expanded state or radially collapsed onto an end portion of at least one electrical cables.

Throughout the present description and in the following claims, the terms "radial" and "axial" (or "longitudinal") are used to indicate a perpendicular direction and a parallel direction, respectively, to a reference longitudinal axis of the screen connector or of the jointing assembly. The expression "radially inner/outer" is instead used by referring to the position along a radial direction with respect to the above-mentioned longitudinal axis, while the expression "axially inner/outer" is used by referring to the position along a parallel direction to the aforementioned longitudinal axis and with respect to a reference plane perpendicular to said longitudinal axis and intersecting the screen connector or the jointing assembly.

In at least one of the aforementioned aspects the present invention can comprise at least one of the following preferred features.

Preferably, the screen connector comprises, at the axially opposite end portions thereof, at least one first watertight element radially interposed between said at least one removable support element and said shrinkable protective sleeve.

Preferably, said at least one first watertight element is radially interposed between said at least one removable support element and said conductive shield sock.

Preferably, the screen connector comprises, at the axially opposite end portions thereof, at least one second watertight element, said at least one second watertight element being radially interposed between said conductive shield sock and said shrinkable protective sleeve.

In a preferred embodiment thereof, the screen connector comprises at least one metallic braid coupled to said conductive shield sock and radially interposed between said conductive shield sock and said shrinkable protective sleeve.

Preferably, the screen connector comprises a connection element associated with said conductive shield sock, wherein said connection element is a plug-in electrical connector, or a lug or a mechanical connector.

In a first embodiment of the present invention, said at least one removable support element comprises a tubular element defined by a rigid body.

In an alternative embodiment of the present invention, said at least one removable support element comprises a tubular element defined by a helically wound strip.

As stated above, the jointing assembly can be either in a radially expanded state or in a radially collapsed state.

When the jointing assembly is in a radially expanded state, it comprises at least one removable support element coaxially arranged with respect to said shrinkable sleeve in a radially inner position thereof and adapted to hold said shrinkable sleeve in said radially expanded state.

When the jointing assembly is in a radially collapsed state, it comprises a main connector and at least one electrical cable having an end portion associated with said main connector, said shrinkable sleeve being radially collapsed onto said main connector and said end portion of said at least one electrical cable.

Further features and advantages of a screen connector and of a jointing assembly comprising a screen connector in accordance with the present invention will appear more clearly from the following detailed description of some preferred embodiments thereof, such description being provided merely by way of non-limiting examples and being made with reference to the annexed drawings. In such drawings.

Figure 1:
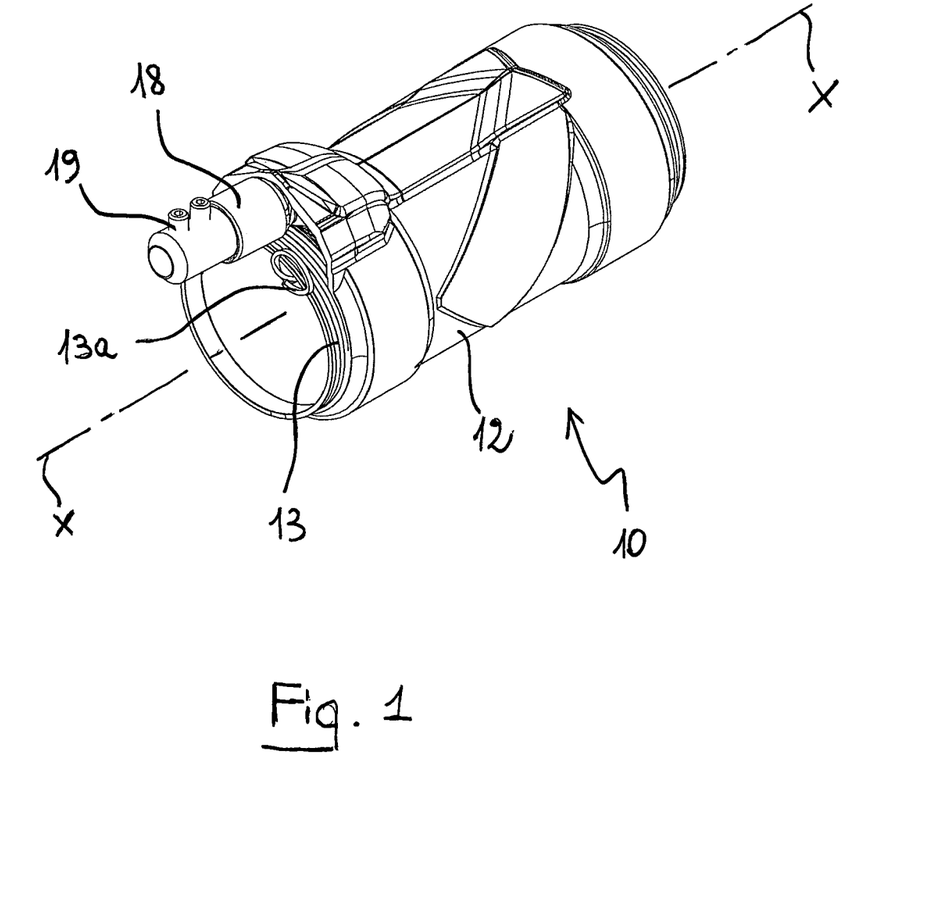
FIG. 1 is a schematic perspective view of a first embodiment of a screen connector according to the present invention.
Figure 2:
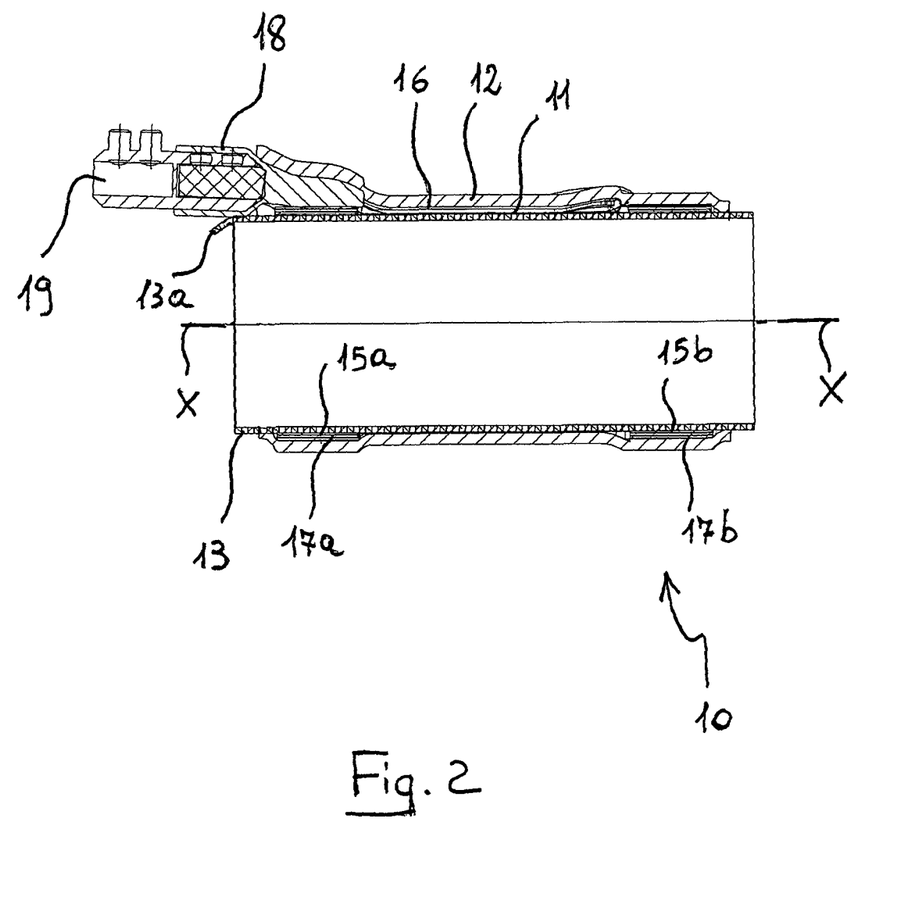
FIG. 2 is a schematic view of a longitudinal section of the screen connector of FIG. 1.
Figure 3:
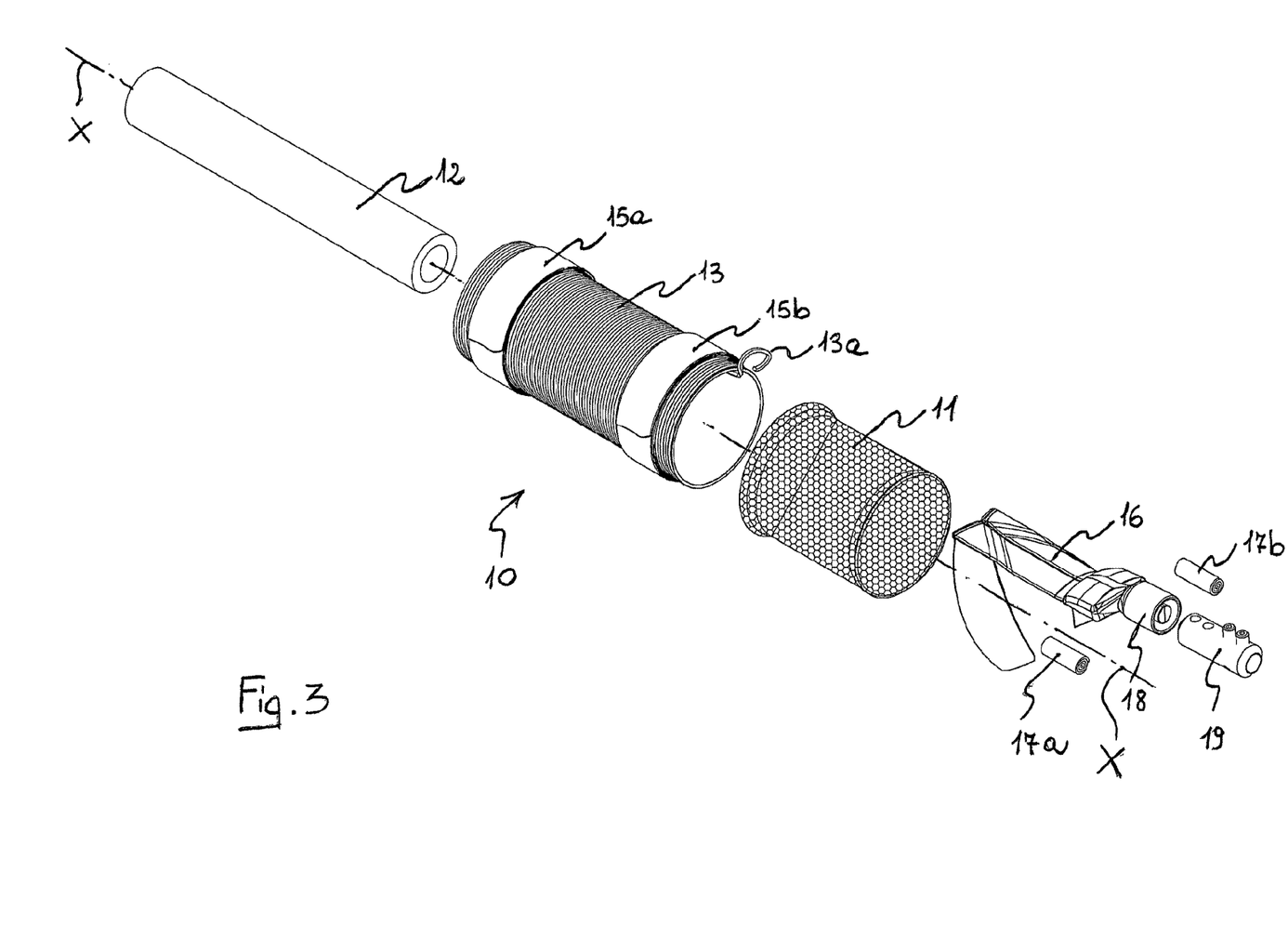
FIG. 3 is a schematic exploded view of the screen connector of FIG. 1.

With respect to FIGS. 1 to 3, a screen connector for electrical cables according to the present invention is indicated with numeral reference 10. The screen connector is preferably adapted to be used with high voltage electrical cables.

As better explained in the following of the present description, the screen connector 10 can be used for connecting an electrical cable to the ground, or to a termination, or to another electrical cable through a joint, or to another electrical cable associated with another joint.

The screen connector 10 comprises a conductive shield sock 11 (not visible in FIG. 1) extending about a longitudinal axis X-X.

In a radially outer position with respect to the conductive shield sock 11, a shrinkable protective sleeve 12 made from an elastomeric material is provided. In FIG. 3 the protective sleeve 12 is shown in rest configuration, that is in radially collapsed state (before application over the conductive shield sock 11).

The conductive shield sock 11 is adapted to be coaxially arranged onto a conductive screen of an electrical cable to provide electrical contact therewith. Similarly, the conductive shield sock 11 is adapted to be coaxially arranged onto a conductive screen of a cable joint or onto an end portion of a cable termination. If the termination has a conductive screen too, then the conductive shield sock 11 is adapted to be coaxially arranged onto said conductive screen.

For application on a cable joint, termination or the like, the shrinkable protective sleeve 12 and the conductive shield sock 11 are held in a radially expanded state by a removable support element 13 arranged in a radially inner position with respect to the conductive shield sock 11.

In the embodiment shown, the support element 13 is a tubular element defining a helically wound strip (either helically wound or cut in a solid tube). Said strip has a free end portion 13a adapted to be pulled in order to remove the support element 13 from the screen connector 10, causing the shrinkable protective sleeve 12 and the conductive shield sock 11 to radially collapse.

In an alternative embodiment not shown, the support element is a rigid tubular element adapted to be moved out from the screen connector by displacement along the longitudinal axis X-X.

As shown in FIGS. 2 and 3, two watertight elements 15a, 15b are provided at the opposite axial end of the support element 13 in a radially inner position with respect to the conductive shield sock 11, that is radially interposed between the support element 13 and the conductive shield sock 11. Preferably, the watertight elements are made by winding about the support element 13 at least one mastic tape.

One or more metallic braids (here two metallic braids are shown, both indicated with 16) lie onto the conductive shield sock 11 so as to be radially interposed between said conductive shield sock 11 and the shrinkable protective sleeve 12. These metallic braids act as ground connectors. A single metallic braid 16 can be used in place of the two described above. No specific mechanical connection, such as welding, are required to maintain in the desired position the metallic braids 16. Indeed, maintenance of the desired position is achieved through the shrinking action exerted by the shrinkable protective sleeve 12.

Two additional watertight elements are radially interposed between the conductive shield sock 11 and the shrinkable protective sleeve 12 at the opposite axial ends of the support element 13. Preferably, these additional watertight elements are made by winding mastic tapes 17a, 17b (see FIG. 3) about the conductive shield sock 11 at the same axial position of the watertight elements 15a, 15b (FIG. 2).

In the embodiment shown in FIGS. 1-3, a connection element 19 is firmly arranged within a seat 18 associated with the metallic braids 16. The connection element 19 is in particular a mechanical connector but other types of connection elements, e.g. mechanical punches, can be used in place of the mechanical connector, such as for example plug-in electrical connectors or lugs.

Figure 4:
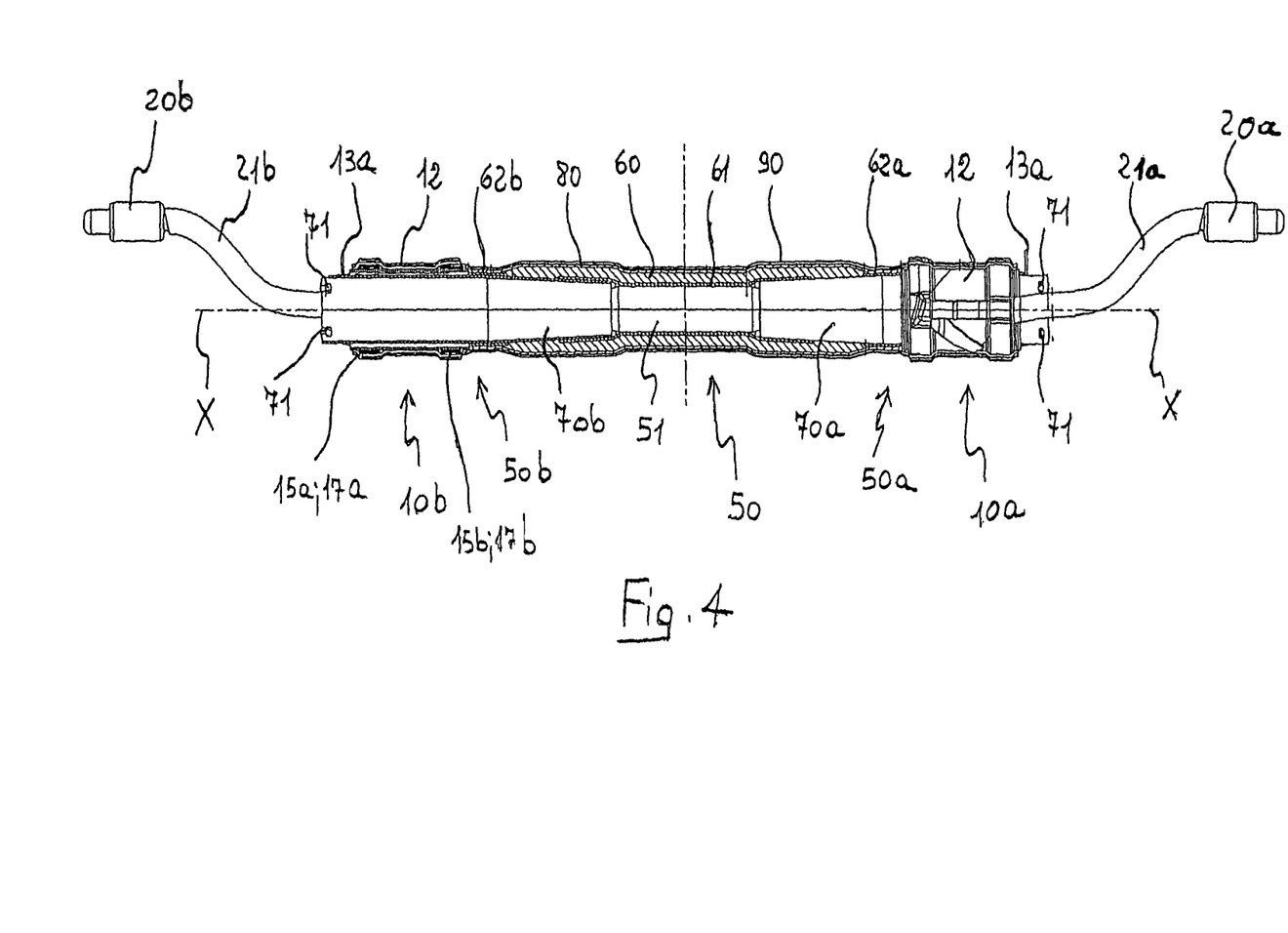
FIG. 4 is a schematic partially sectioned view of a first embodiment of a jointing assembly according to the present invention, in a specific operative configuration.

A different embodiment of a screen connector 10 in accordance with the present invention is shown in FIG. 4. Specifically, two screen connectors 10a, 10b are shown in FIG. 4, each one associated with a respective free end portion 50a, 50b of a joint 50 adapted to connect two electrical cables (not shown in this figure but shown in FIG. 5). The joint 50 of FIG. 4 is shown in a radially expanded state.

The screen connectors 10a, 10b of FIG. 4 differ from that of FIGS. 1 to 3 in that a plug-in electrical connector 20a, 20b is used in place of the mechanical connector 19. In this case, each plug-in electrical connector 20a, 20b is associated with the metallic braids 16 by at least one elongated metallic arm 21a, 21b. Preferably, the metallic arms 21a, 21b are covered by a sheet of elastomeric material.

Figure 5:
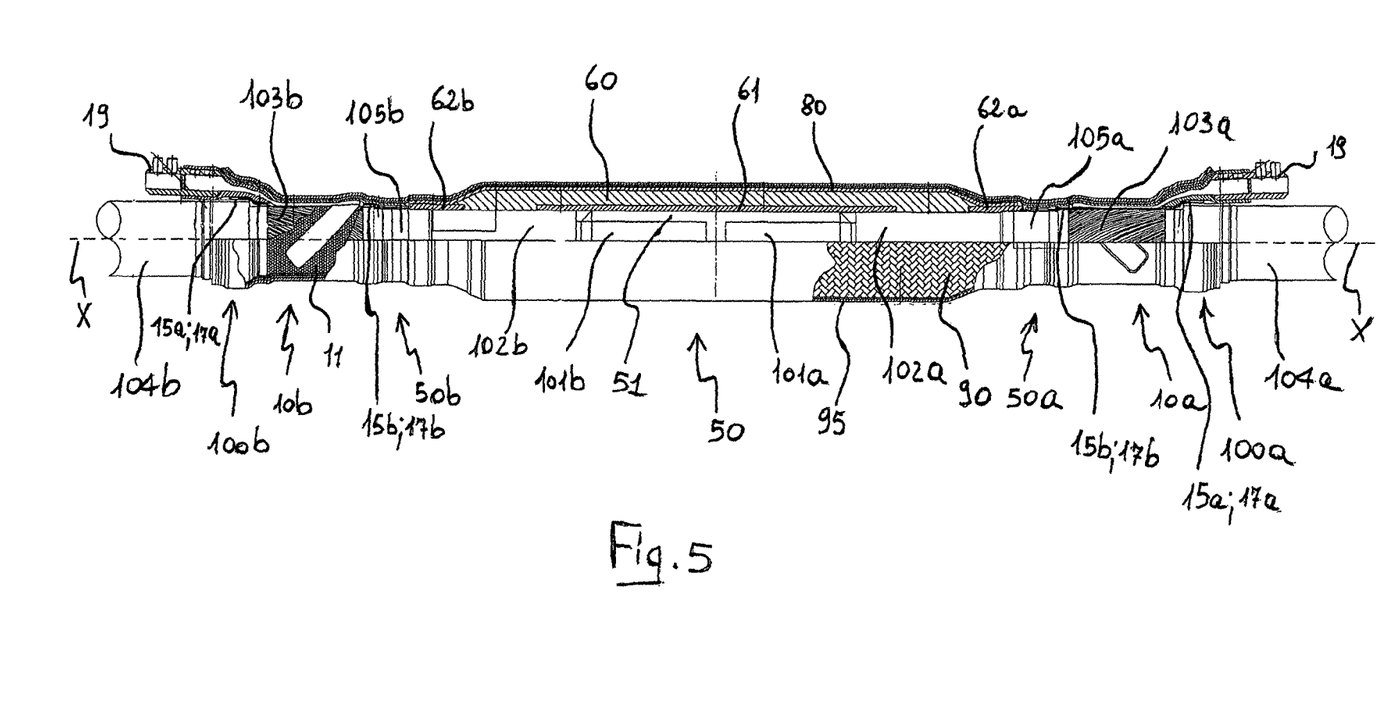
FIG. 5 is a schematic partially sectioned view of a second embodiment of a jointing assembly according to the present invention, in a specific operative configuration.

FIG. 5 shows a joint 50 with two electrical cables 100a, 100b connected thereto. Here, differently from FIG. 4, two screen connectors 10a, 10b of the type above-described with reference to FIGS. 1 to 3 are used. Furthermore, the joint 50 is provided with an outer shield (described below) not shown in FIG. 4.

The joint 50 of FIG. 5 is shown in a collapsed configuration over the electrical cables 100a, 100b.

As shown in FIGS. 4 and 5, the joint 50 comprises a connector 51 extending about a longitudinal axis corresponding to the longitudinal axis X-X of the screen connectors 10a, 10b.

The connector 51 is a socket connector, that is it comprises axially opposite end portions each provided with a seat adapted to house and lock into a desired axial position respective plug-in connectors 101a, 101b (FIG. 5) associated with a free end portion of a respective electrical cable.

The joint 50 comprises a radially shrinkable sleeve 60, in a radially outer position with respect to the connector 51. The sleeve 60 can be made from heat or cold shrinkable dielectric materials. Preferably, the sleeve 60 is made of a cold shrinkable dielectric material, such as ethylene propylene diene monomer (EPDM) rubber.

The sleeve 60 extends coaxially to the longitudinal axis X-X and has a length greater than that of the connector 51. The connector 51 is centrally arranged within the sleeve 60 along the longitudinal axis X-X so as to have a symmetrical arrangement of the sleeve 60 about the connector 51 along the longitudinal axis X-X.

The sleeve 60 comprises, at a radially inner portion thereof, a first cylindrical insert 61 made from a conductive or semi-conductive material. Throughout the following description, the insert 61 will be indicated as "electrode".

Preferably, the electrode 61 is made from a cold shrinkable semi-conductive material. More preferably, such a material is rubber EPDM.

The electrode 61 extends coaxially to the longitudinal axis X-X and has a length greater than that of the connector 51 and lower than that of the sleeve 60. The electrode 61 is symmetrically arranged with respect the connector 51 and the sleeve 60 along the longitudinal axis X-X.

The sleeve 60 further comprises, at each of the end portions thereof, a respective second cylindrical insert 62a, 62b, made from a conductive or semi-conductive material. Throughout the following description, the inserts 62a, 62b will be indicated as "deflectors".

The deflectors 62a, 62b cooperate with the electrode 61 to control the electrical field within the sleeve 60, in particular to avoid the presence of areas with high concentration of electrical field, wherein undesired electrical discharges and breakdowns could occur.

Preferably, the deflectors 62a, 62b are made from a cold shrinkable semi-conductive material. More preferably such a material is EPDM or silicone rubber. Alternatively, the deflectors 62a, 62b are made from a high permittivity material.

Each of the deflectors 62a, 62b extends coaxially to the longitudinal axis X-X and axially projects inside the sleeve 60 toward the electrode 61 so that the radially inner portion of the sleeve 60 is defined, moving from the central portion toward each of the end portions thereof, by the electrode 61, the dielectric material of the sleeve 60 and the deflector 62a, 62b.

In the joint 50 of FIG. 4 the electrode 61 and the deflectors 62a, 62b are incorporated into the dielectric material of the sleeve 60.

In an alternative embodiment (not shown), the electrode and the deflectors are not incorporated into the dielectric material of the sleeve 60, but are arranged in a radially inner position with respect to the radially inner surface of the sleeve 60.

As shown in FIG. 4, the sleeve 60 is initially held in a radially expanded state by two support elements 70a, 70b which are arranged in a radially inner position with respect to the sleeve 60, the electrode 61 and the deflectors 62a, 62b.

In this configuration, the support elements 70a, 70b are associated with each other by a connecting element 71 adapted to hold the support elements 70a, 70b within the sleeve 60. Only the opposite free end portions of the connecting element 71 are visible in FIG. 4.

After having mechanically and electrically coupled the two electrical cables 100a, 100b to the connector 51, the support elements 70a, 70b are axially removed from the opposite end portions of the sleeve 60 along opposite directions, thus causing the sleeve 60, together with the electrode 61 and the deflectors 62a, 62b, to shrink onto the electrical cables 100a, 100b, so as to take the configuration shown in FIG. 5. In order to remove the support elements 70a, 70b, the aforementioned connecting element 71 is broken.

In the embodiment shown in FIG. 4, each support element 70a, 70b comprises a tubular rigid body made from a plastic material. Preferably, each of the tubular rigid body is made of a charged homopolymer polypropylene.

In an alternative embodiment (not shown) of the jointing assembly, each support element is a tubular element defining a helically wound strip (either helically wound or cut in a solid tube). The strip is adapted to be removed from the respective end portion of the sleeve by pulling a free end portion of the strip.

As better shown in FIG. 5, the joint 50 further comprises, in a radially outer position with respect to the sleeve 60, a first shield 80. The shield 80 has a length substantially equal to that of the sleeve 60.

Preferably, the shield 80 is made of a two-layer sheath including an radially inner layer and a radially outer layer.

The radially inner layer is preferably made from a dielectric material, more preferably rubber EPDM, while the radially outer layer is preferably made from a semi-conductive material, more preferably rubber EPDM.

In a radially outer position with respect to the first shield 80, a metallic screen 90 is provided. The screen 90 has a length greater than that of the sleeve 60 and is preferably made of tinned copper.

The joint 50 further comprises, in a radially outer position with respect to the screen 90, a second shield 95 having preferably a length substantially equal to that of the screen 90.

Preferably, the shield 95 is made of a two-layer sheath, that is it includes a radially inner layer made from a dielectric material and a radially outer layer made from a semi-conductive material. More preferably, the same material of the shield 80 is used.

As far as the electrical cables 100a, 100b are concerned, as shown in FIG. 5, the conductors of each electrical cable 100a, 100b are covered by an insulating layer 102a, 102b. A conductive screen 103a, 103b is coaxially applied at a radially outer position to the insulating layer 102a, 102b. The conductive screen 103a, 103b is in turn covered with at least one protective sheath 104a, 104b of electrically insulating plastic or elastomeric material.

Preferably each electrical cable 100a, 100b further comprises at least one semi-conductive layer 105a, 105b radially interposed between the insulating layer 102a, 102b and the conductive screen 103a, 103b.

In the embodiment of FIG. 5, the conductive screen 103a, 103b of the electrical cables 100a, 100b are electrically connected to each other through the metallic screen 90 of the joint 50.

To this end, the opposite end portions of the second shield 95 of the joint 50 are folded back toward each other (or, in an alternative embodiment not shown, they are held in a radially expanded state by respective removable rigid bodies) and each of the opposite free end portions of the metallic screen 90 is arranged in a radially outer position with respect to a respective conductive screen 103a, 103b of a respective electrical cable 100a, 100b.

Advantageously, each screen connector 10a, 10b is in turn arranged in a radially outer position with respect to the aforementioned free end portions of the metallic screen 90 of the joint 50 so that, upon removal of the support element 13 of the screen connector 10a, 10b, the shrinkable protective sleeve 12 and the conductive shield sock 11 of the screen connectors 10a, 10b shrink onto the metallic screen 90 of the joint 50 and the conductive screen 103a, 103b of the electrical cable 100a, 100b, obtaining the desired electrical contact between conductive screen 103a, 103b, metallic screen 90 and conductive shield sock 11.

Afterwards, the opposite end portions of the second shield 95 of the joint 50 are unfolded to fully cover the screen connectors 10a, 10b, leaving out just the connection elements 19.

The embodiment of FIG. 5 allows each of the conductive screen 103a, 103b of the electrical cables 100a, 100b connected to the joint 50 to be connected through the screen connectors 10a, 10b to the ground.

The embodiment of FIG. 5 also allows each of the conductive screen 103a, 103b of the electrical cables 100a, 100b connected to the joint 50 to be connected to an electrical cable connected to another joint.

In a different embodiment not shown, the screen connectors 10a, 10b are associated with a joint as that of FIGS. 4 and 5, the metallic screen 90 is provided, but it is interrupted. In this case, the reciprocal electrical connection between the conductive screen 103a, 103b of the two electrical cables 100a, 100b can be achieve by connecting to each other the plug-in electrical connectors 20a, 20b associated with each other. Of course, in this case one of the electrical connectors 20a, 20b could be a male connector and the other one could be a female connector.

Figure 6:
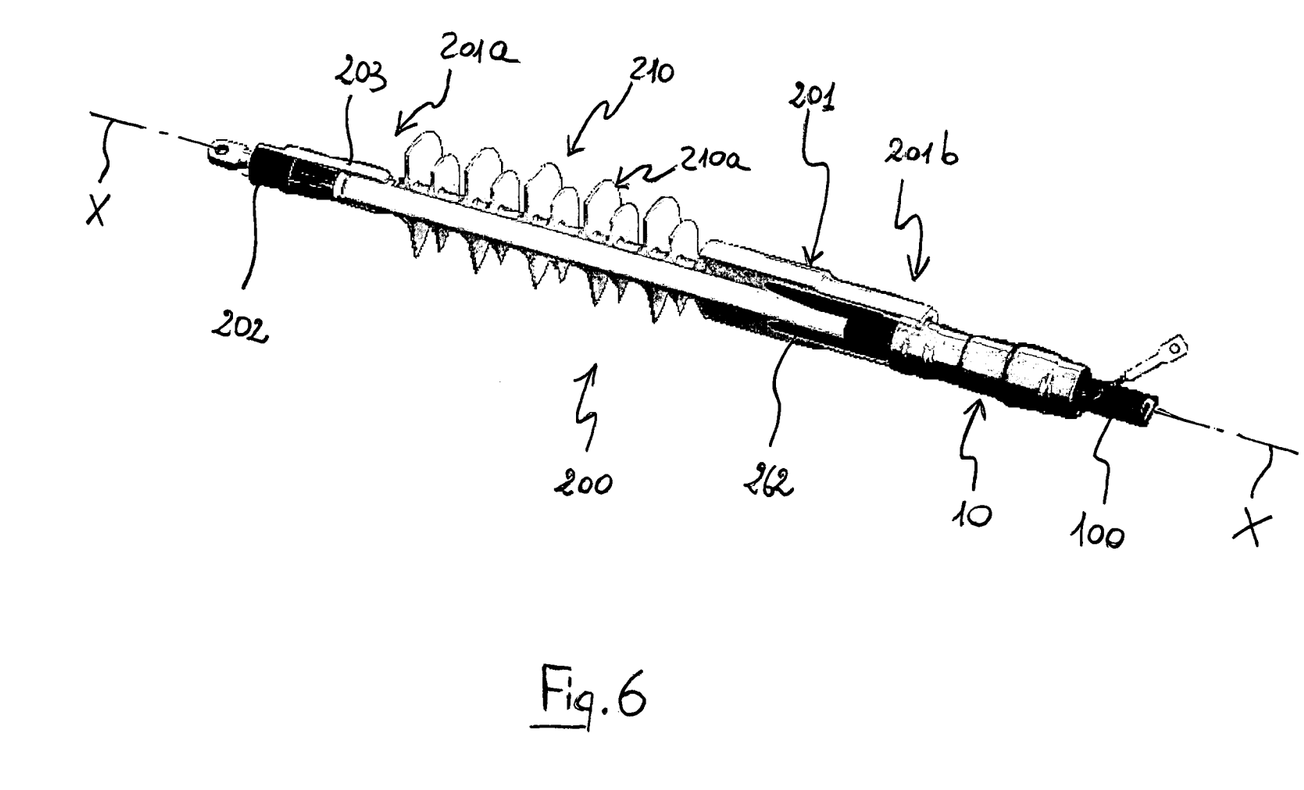
FIG. 6 is a schematic perspective view of a further embodiment of a jointing assembly according to the present invention, in a specific operative configuration.

FIG. 6 shows a further embodiment. In this embodiment the screen connector 10 is associated with a termination 200 which is in turn associated with an electrical cable 100.

The termination 200 comprises a shrinkable body 201 extending about a longitudinal axis X-X. The shrinkable body 201 is made from dielectric material.

The shrinkable body 201 comprises a portion 210 shaped so as to define a plurality of fins (all indicated with 210a).

A deflector 262 for controlling the electrical field is incorporated in the material of the shrinkable body 201.

The electrical cable 100 is inserted in an axial cavity of the shrinkable body 201 and is connected with a plug-in connector 202 housed in a cap 203 associated with a free end portion 201a of the shrinkable body 201. The cap 203 is made of an elastomeric material.

On the axially opposite free end portion 201b of the shrinkable body 201a screen connector 10 of the above-described is provided. In particular, an end portion of the screen connector 10 is arranged in a radially inner position with respect to the end portion 201b of the shrinkable body 201 so as to provide an electrical connection between the conductive shield sock 11 of the screen connector 10 and the conductive screen of the electrical cable 100. By this way, the electrical cable 100 can be connected to the ground.

The shrinkable body 201 is held in a radially expanded state by a removable support element (not visible) arranged in a radially inner position thereto. When this support element is removed, the shrinkable body 201 collapses onto the electrical cable 100. The removable support element can be a tube cut into a helically wound strip or a removable rigid tubular element, similarly to what stated above with respect to the removable support element of the screen connector 10 and of the joint 50.

The termination may or not be provided with a conductive screen. Should the conductive screen be provided, the conductive shield sock 11 of the screen connector 10 is preferably arranged in a radially outer position with respect to the conductive screen of the termination.

The skilled person will understand that, starting from the above described different embodiments of the jointing assembly of the present invention, a plurality of further different embodiments can be foreseen by combining in different ways the various features described above. All these embodiments are indeed encompassed by the present invention and are within the scope of protection defined by the attached claims.

The invention claimed is:

1. A jointing assembly for electrical cables, the jointing assembly comprising:
    a shrinkable sleeve of dielectric material, extending about a longitudinal axis, the shrinkable sleeve of dielectric material configured to receive an electrical cable;
    a connector configured to connect an electrical cable to an electrical component, said connector being housed in a radially inner position in the shrinkable sleeve;
    at least one removable support element coaxially arranged with respect to the shrinkable sleeve in a radially inner position of the shrinkable sleeve and configured to hold the shrinkable sleeve in a radially expanded state; and at least one screen connector positioned at least at one end portion of the shrinkable sleeve, the at least one screen connector including,
a conductive shield sock extending about the longitudinal axis and configured to couple to a conductive screen of one electrical cable;
a shrinkable protective sleeve arranged in a radially outer position with respect to the conductive shield sock;
at least one further removable support element arranged in a radially inner position with respect to the conductive shield sock and configured to hold the conductive shield sock and the shrinkable protective sleeve in a radially expanded state.

2. The jointing assembly of claim 1, wherein the at least one further removable support element includes a tubular element.

3. The jointing assembly of claim 2, wherein the tubular element is defined by a rigid body or a helically wound strip.

4. The jointing assembly of claim 1 further comprising:
a metallic screen in a radially outer position with respect to the shrinkable sleeve.

5. The jointing assembly of claim 4 wherein the screen connector is arranged in a radially outer position with respect to the metallic screen.

6. The jointing assembly of claim 4 wherein the screen connector is arranged in a radially inner position with respect to the shrinkable sleeve.

7. The jointing assembly of claim 1 wherein the shrinkable sleeve includes a cylindrical insert made from a conductive or semi-conductive material.

8. The jointing assembly of claim 7 wherein the cylindrical insert is incorporated into the dielectric material of the shrinkable sleeve.

9. The jointing assembly of claim 1, further comprising:
at the axially opposite end portions of the screen connector, at least one watertight element radially interposed between the at least one removable support element and the shrinkable protective sleeve.

10. The jointing assembly of claim 9, wherein the at least one watertight element is radially interposed between the at least one removable support element and the conductive shield sock.

11. The jointing assembly of claim 9, further comprising:
at axially opposite end portions of the screen connector, at least one additional watertight element;
wherein the at least one additional watertight element is radially interposed between the at least one further removable support element and the shrinkable protective sleeve.

12. The jointing assembly of claim 11, wherein the at least one watertight element and the at least one additional watertight element are arranged at a same axial position.

13. The jointing assembly of claim 11, wherein the at least one additional watertight element is radially interposed between the at least one first removable support element and the conductive shield sock.

14. The jointing assembly of claim 1, further comprising:
at least one metallic braid coupled to the conductive shield sock and radially interposed between the conductive shield sock and the shrinkable protective sleeve.

15. The jointing assembly of claim 1, further comprising:
a connection element associated with the conductive shield sock;
wherein the connection element is a plug-in electrical connector, a lug, or a mechanical connector.

16. The jointing assembly of claim 1, wherein the at least one further removable support element includes a tubular element defined by a rigid body.

17. The jointing assembly of claim 1, wherein the at least one further removable support element includes a tubular element defined by a helically wound strip.

* * * * *